(No Model.) 2 Sheets—Sheet 1.

J. W. COOPER.
CAR TRUCK.

No. 503,831. Patented Aug. 22, 1893.

Witnesses

Inventor
John W. Cooper.
By Attorneys R.S. & A.P. Lacey

UNITED STATES PATENT OFFICE.

JOHN W. COOPER, OF MATAWAN, NEW JERSEY.

CAR-TRUCK.

SPECIFICATION forming part of Letters Patent No. 503,831, dated August 22, 1893.

Application filed November 3, 1892. Serial No. 450,858. (No model.)

*To all whom it may concern:*

Be it known that I, JOHN W. COOPER, a citizen of the United States, residing at Matawan, in the county of Monmouth, State of New Jersey, have invented certain new and useful Improvements in Means for Positively Aligning Car-Trucks; and I do hereby declare the following to be a full, clear, and exact description of the invention, such as will enable others skilled in the art to which it appertains to make and use the same.

This invention relates to provisions for positively bringing the car truck into proper relation with the car body after the said truck has passed a curve in the track.

The object of the invention is to enable a car truck to adapt itself to the curve in the track and bring the same to a normal position after the said curve has been passed by positive and automatic means.

The invention consists of a yielding connection between the car body and truck which under normal condition will serve to hold the truck so that the car axles will remain at right angles to the line of draft, and which will yield as the said truck passes around a curve, and which after the said curve has been passed will regain itself and return the truck to a normal position. Practical demonstration has shown that a weighted lever gives the best results in that the same is thrown from a perpendicular position when the truck strikes a curve in the track and automatically adjusts the truck to the curve, thereby obviating friction between the truck wheels and rails.

The invention further consists of the novel features and the peculiar construction and combination of the parts which will be hereinafter more fully described and claimed and which are shown in the annexed drawings, in which—

Figure 1:
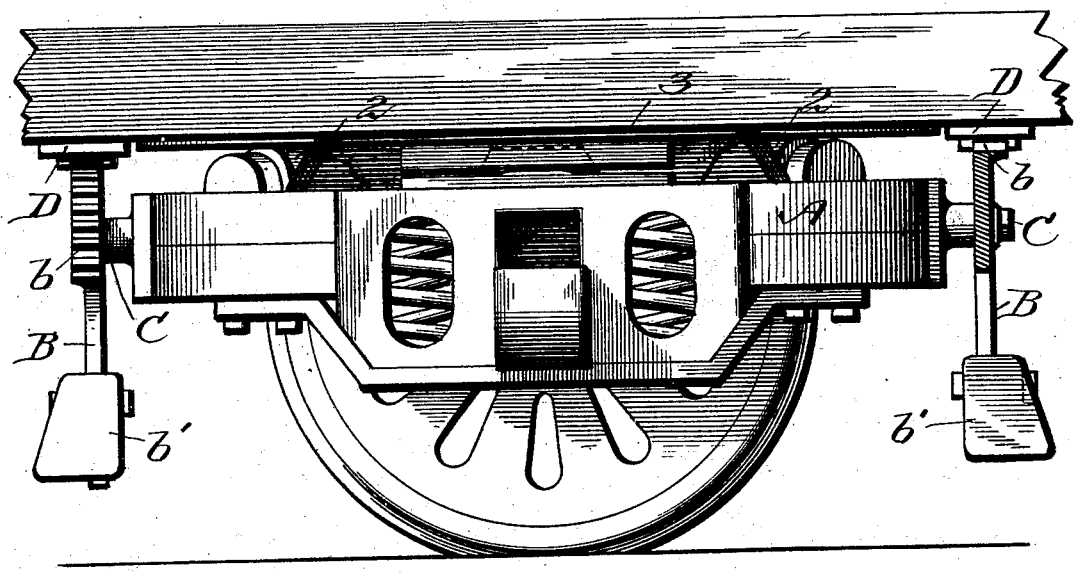
Figure 3:
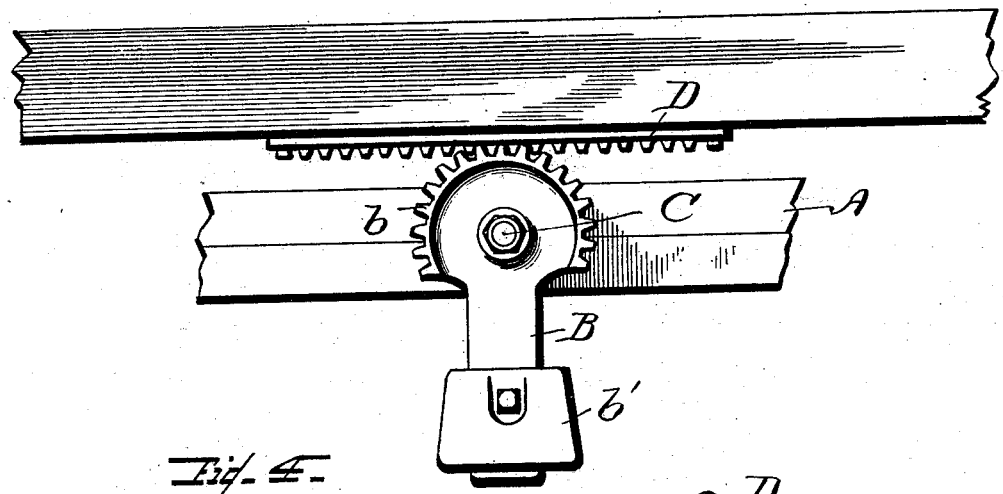
Figure 4:
Figure 2:
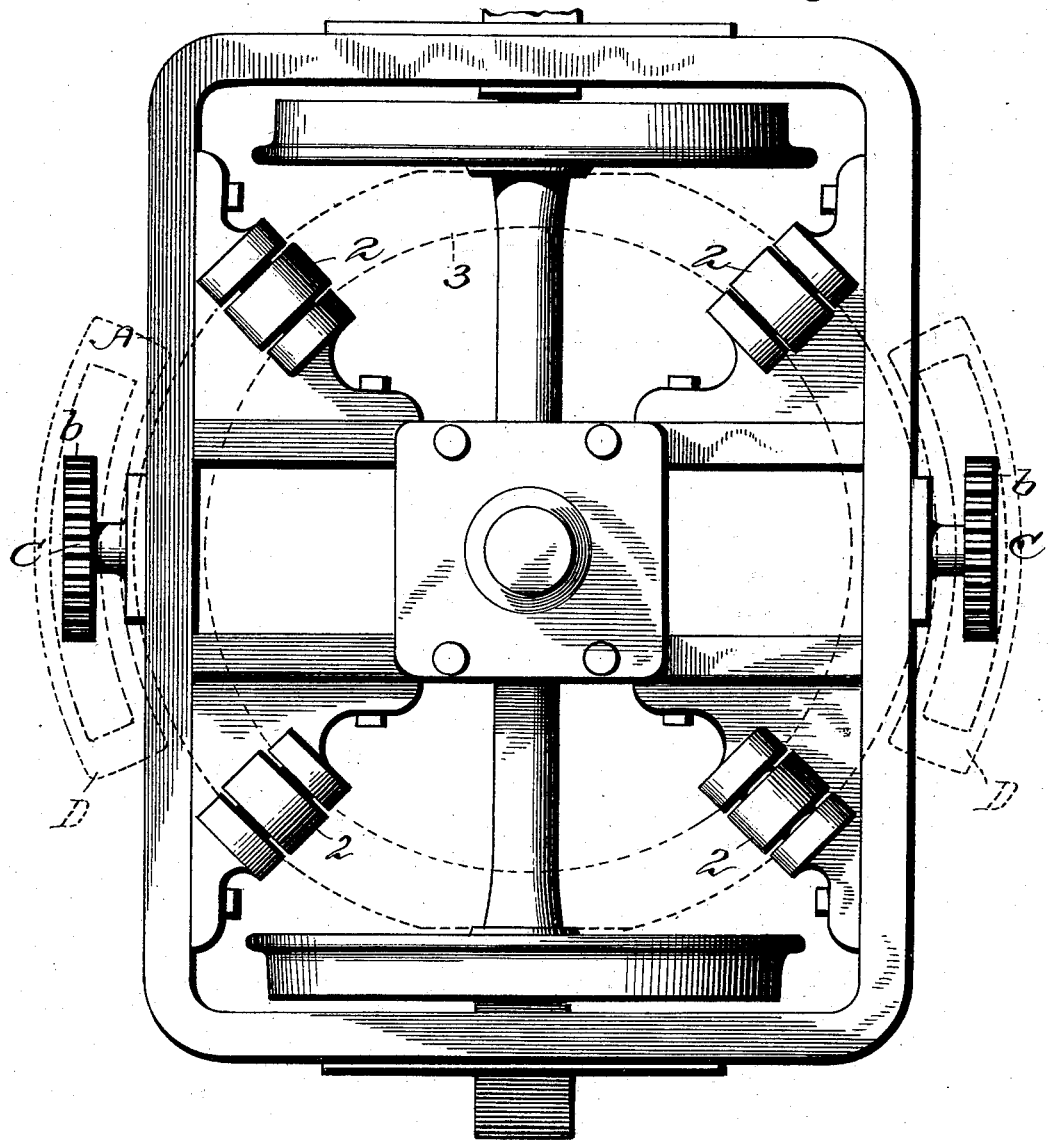

Figure 1 is a side elevation of the end portion of a car showing the application of my invention thereto, parts being broken away to show the relative position of the toothed end of the weighted lever and the rack bar. Fig. 2 is a top plan view of a truck showing the relative position of the racks which are attached to the bottom of the car by dotted lines. Fig. 3 is a front view of the weighted lever and rack bar. Fig. 4 is a bottom plan view of the rack bar which is attached to the under side of the car.

The car and the truck may be of any approved form of construction, it being essential that the truck have a pivotal connection with the said car so as to adapt itself to the curves in the track.

The invention will be applied to each of the trucks whether there be two or more to a car, and there will be one or more yielding connections between the truck and car as required. One connection for each truck will effect the desired purpose but for balancing and evenly distributing the strain there will be two of such connections for each truck and they will be located at diametrically opposite points, preferably in a line corresponding with the line of draft whereby they will be located beneath the car and hidden from view, and where a slight turning of the truck will effect a lateral flirt of the weighted lever and cause the same to assist in a further adjustment of the truck to the curvature of the track thereby obviating undue friction between the car wheels and the rails.

To relieve the friction between the truck and the bed of the car anti-friction rollers 2 are provided on the truck frame and adapted to travel on a ring 3 which is attached to the under side of the car bed. The weighted lever B is mounted upon a stud C which is projected laterally from the truck frame A, and is provided at its upper end with teeth $b$ which are disposed in a circle having the fulcrum of said lever for its center, thereby forming a segmental toothed head. This segmental toothed head meshes with a rack bar D which is secured to the under side of the bed of the car and is formed on an arc of a circle whose center corresponds with the vertical axis about which the truck is adapted to turn. The weight $b'$ at the lower end of the lever B is adjustable to and from the fulcrum of said lever to vary the efficient force exerted by said weight when performing the work for which it is designed. These rack bars D extend from side to side of the car bed transversely to the line of draft so that a slight movement of the truck when striking a curve will throw the weighted end of the lever from the perpendicular and cause the same to assist in the turning of the truck for the purpose herein specified. After the curve in the track has been passed the weighted lever regaining its normal position will bring the truck in proper relation with the car instantly without binding between the car wheels and rails.

Having thus described my invention, what I claim, and desire to secure by Letters Patent, is—

1. The combination with a car, and a pivoted truck, of a weighted lever adapted to form positive connection between said car and truck and constructed to facilitate the turning of the truck to adapt it to the track, substantially as set forth.

2. The combination with a car, and a pivoted truck, of a rack bar attached to said car, and a weighted lever pivoted to the truck, and having a segmental toothed portion which is adapted to mesh with said rack, substantially as described for the purpose specified.

3. The combination with a car, and a pivoted truck, of a rack bar secured to the truck and formed on the arc of a circle having its center co-incident with the vertical axis of the truck, and a weighted lever pivotally supported on the truck frame and having a segmental toothed end to mesh with said rack, substantially as and for the purpose specified.

In testimony whereof I affix my signature in presence of two witnesses.

JOHN W. COOPER.

Witnesses:
FRANK P. McDERMOTT,
DANIEL E. PATTERSON.